US008140520B2

(12) United States Patent
Day et al.

(10) Patent No.: US 8,140,520 B2
(45) Date of Patent: Mar. 20, 2012

(54) EMBEDDING DENSITIES IN A DATA STRUCTURE

(75) Inventors: Paul R. Day, Rochester, MN (US);
Randy L. Egan, Rochester, MN (US);
Roger A. Mittelstadt, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 533 days.

(21) Appl. No.: 12/120,773

(22) Filed: May 15, 2008

(65) Prior Publication Data

US 2009/0287639 A1    Nov. 19, 2009

(51) Int. Cl.
*G06F 17/30* (2006.01)
(52) U.S. Cl. .......................................................... 707/715
(58) Field of Classification Search .................. 707/715
See application file for complete search history.

(56) References Cited

U.S. PATENT DOCUMENTS

| | | | |
|---|---|---|---|
| 5,493,643 A | 2/1996 | Soderberg et al. | |
| 5,706,495 A | 1/1998 | Chadha et al. | |
| 6,003,036 A | 12/1999 | Martin | |
| 6,216,125 B1 | 4/2001 | Johnson | |
| 6,338,055 B1 * | 1/2002 | Hagmann et al. ................... 1/1 |
| 6,356,888 B1 | 3/2002 | Egan et al. | |
| 6,363,371 B1 * | 3/2002 | Chaudhuri et al. ................... 1/1 |
| 6,405,187 B1 | 6/2002 | Egan et al. | |
| 7,020,647 B1 | 3/2006 | Egan et al. | |
| 8,015,191 B2 * | 9/2011 | Day et al. ....................... 707/745 |
| 2002/0052868 A1 | 5/2002 | Mohindra et al. | |
| 2003/0084057 A1 | 5/2003 | Balogh | |
| 2004/0010488 A1 * | 1/2004 | Chaudhuri et al. ............... 707/3 |
| 2004/0267397 A1 | 12/2004 | Doddi et al. | |
| 2005/0027692 A1 | 2/2005 | Shyam et al. | |
| 2006/0041544 A1 | 2/2006 | Santosuosso | |
| 2006/0155915 A1 | 7/2006 | Pereira | |

OTHER PUBLICATIONS

U.S. Appl. No. 12/013,036, filed Jan. 11, 2008 by Paul Day et al., titled "Database Query Optimization Using Index Carryover to Subset an Index".
U.S. Appl. No. 12/056,879, filed Mar. 27, 2008 by Paul R Day et al., titled "Implementing Dynamic Processor Allocation Based Upon Data Density".
U.S. Patent and Trademark Office, Notice of Allowance issued in related U.S. Appl. No. 12/056,879, dated May 4, 2011.
U.S. Patent and Trademark Office, Advisory Action issued in related U.S. Appl. No. 12/056,879, dated Dec. 10, 2010.
U.S. Patent and Trademark Office, Final Office Action issued in related U.S. Appl. No. 12/056,879, dated Nov. 24, 2010.
U.S. Patent and Trademark Office, Office Action issued in related U.S. Appl. No. 12/056,879, dated Jul. 2, 2010.
U.S. Patent and Trademark Office, Final Office Action issued in related U.S. Appl. No. 12/120,706 dated May 18, 2011.

(Continued)

*Primary Examiner* — James Trujillo
*Assistant Examiner* — William Spieler
(74) *Attorney, Agent, or Firm* — Wood, Herron & Evans LLP

(57) ABSTRACT

A method, apparatus and program product that determine a density for each key value of a plurality of key values in a table over at least one range of rows in the database table, and store the determined densities in a data structure for use in optimizing a query that references a key value in the plurality of key values in the table. By doing so, the density of various key values may be determined and dynamically maintained, often resulting in optimization data for improved query optimization.

23 Claims, 10 Drawing Sheets

OTHER PUBLICATIONS

U.S. Patent and Trademark Office, Office Action issued in related U.S. Appl. No. 12/120,706 dated Dec. 1, 2010.

U.S. Patent and Trademark Office, Final Office Action issued in related U.S. Appl. No. 12/013,036 dated Jul. 8, 2011.

U.S. Patent and Trademark Office, Office Action issued in related U.S. Appl. No. 12/013,036 dated Feb. 18, 2011.

U.S. Patent and Trademark Office, Office Action issued in related U.S. Appl. No. 12/013,036 dated Aug. 31, 2010.

* cited by examiner

Table_1

| Field_1 | Field_2 | Field_3 | Field_4 | Field_5 | City Field | RRN (for reference) |
|---------|---------|---------|---------|---------|------------|---------------------|
| ... | ... | ... | ... | ... | Austin | 1 |
| ... | ... | ... | ... | ... | Albert Lea | 2 |
| ... | ... | ... | ... | ... | Austin | 3 |
| ... | ... | ... | ... | ... | Austin | 4 |
| ... | ... | ... | ... | ... | Austin | 5 |
| ... | ... | ... | ... | ... | Stewartville | 6 |
| ... | ... | ... | ... | ... | Austin | 7 |
| ... | ... | ... | ... | ... | Austin | 8 |
| ... | ... | ... | ... | ... | Austin | 9 |
| ... | ... | ... | ... | ... | Austin | 10 |
| ... | ... | ... | ... | ... | Byron | 11 |
| ... | ... | ... | ... | ... | Rochester | 12 |
| ... | ... | ... | ... | ... | Austin | 13 |
| ... | ... | ... | ... | ... | Austin | 14 |
| ... | ... | ... | ... | ... | Austin | 15 |
| ... | ... | ... | ... | ... | Austin | 16 |
| ... | ... | ... | ... | ... | Austin | 17 |
| ... | ... | ... | ... | ... | Byron | 18 |
| ... | ... | ... | ... | ... | Byron | 19 |
| ... | ... | ... | ... | ... | Byron | 20 |
| ... | ... | ... | ... | ... | Austin | 21 |
| ... | ... | ... | ... | ... | Austin | 22 |
| ... | ... | ... | ... | ... | Austin | 23 |
| ... | ... | ... | ... | ... | Albert Lea | 24 |
| ... | ... | ... | ... | ... | Rochester | 25 |
| ... | ... | ... | ... | ... | any city | 26 |
| ... | ... | ... | ... | ... | any city | 27 |
| ... | ... | ... | ... | ... | any city | 28 |
| ... | ... | ... | ... | ... | any city | 29 |
| ... | ... | ... | ... | ... | Rochester | 30 |

FROM FIG. 7A

Table_1

| Field_1 | Field_2 | Field_3 | Field_4 | Field_5 | City Field | RRN (for reference) |
|---|---|---|---|---|---|---|
| ... | ... | ... | ... | ... | any city | 31 |
| ... | ... | ... | ... | ... | any city | 32 |
| ... | ... | ... | ... | ... | Rochester | 33 |
| ... | ... | ... | ... | ... | Rochester | 34 |
| ... | ... | ... | ... | ... | any city | 35 |
| ... | ... | ... | ... | ... | any city | 36 |
| ... | ... | ... | ... | ... | any city | 37 |
| ... | ... | ... | ... | ... | Albert Lea | 38 |
| ... | ... | ... | ... | ... | Albert Lea | 39 |
| ... | ... | ... | ... | ... | Albert Lea | 40 |
| ... | ... | ... | ... | ... | Albert Lea | 41 |
| ... | ... | ... | ... | ... | Albert Lea | 42 |
| ... | ... | ... | ... | ... | Albert Lea | 43 |
| ... | ... | ... | ... | ... | Albert Lea | 44 |
| ... | ... | ... | ... | ... | Albert Lea | 45 |
| ... | ... | ... | ... | ... | Albert Lea | 46 |
| ... | ... | ... | ... | ... | Rochester | 47 |
| ... | ... | ... | ... | ... | Stewartville | 48 |
| ... | ... | ... | ... | ... | Stewartville | 49 |
| ... | ... | ... | ... | ... | Stewartville | 50 |
| ... | ... | ... | ... | ... | any city | 51 |
| ... | ... | ... | ... | ... | Stewartville | 52 |
| ... | ... | ... | ... | ... | Stewartville | 53 |
| ... | ... | ... | ... | ... | Stewartville | 54 |
| ... | ... | ... | ... | ... | Stewartville | 55 |

FIG. 7B

Encoded Vector Index (EVI) for City Field ~290~

Symbol Table for Table_1

| Key values for City | Byte Code | First Row | Last Row | Count |
|---|---|---|---|---|
| Albert Lea | 1 | 2 | 46 | 11 |
| Austin | 2 | 1 | 23 | 16 |
| Byron | 3 | 11 | 20 | 4 |
| ... | ... | ... | ... | ... |
| Rochester | 10 | 12 | 47 | 6 |
| Stewartville | 11 | 48 | 55 | 7 |

Vector Table for Table_1

| Byte Code | RRN (for reference) | City Matching Byte Code (for reference) |
|---|---|---|
| Code 2 | 1 | Austin |
| Code 1 | 2 | Albert Lea |
| Code 2 | 3 | Austin |
| Code 2 | 4 | Austin |
| Code 2 | 5 | Austin |
| Code X | 6 | Stewartville |
| Code 2 | 7 | Austin |
| Code 2 | 8 | Austin |
| Code 2 | 9 | Austin |
| Code 2 | 10 | Austin |
| Code 3 | 11 | Byron |
| Code 10 | 12 | Rochester |
| Code 2 | 13 | Austin |
| Code 2 | 14 | Austin |
| Code 2 | 15 | Austin |
| Code 2 | 16 | Austin |
| Code 2 | 17 | Austin |
| Code 3 | 18 | Byron |
| Code 3 | 19 | Byron |
| Code 3 | 20 | Byron |
| Code 2 | 21 | Austin |
| Code 2 | 22 | Austin |
| Code 2 | 23 | Austin |
| Code 1 | 24 | Albert Lea |
| Code 10 | 25 | Rochester |

FROM FIG. 8A

Vector Table for Table_1

| Byte Code | RRN (for reference) | City Matching Byte Code (for reference) |
|---|---|---|
| Code X | 26 | any city |
| Code X | 27 | any city |
| Code X | 28 | any city |
| Code X | 29 | any city |
| Code 10 | 30 | Rochester |
| Code X | 31 | any city |
| Code X | 32 | any city |
| Code 10 | 33 | Rochester |
| Code 10 | 34 | Rochester |
| Code X | 35 | any city |
| Code X | 36 | any city |
| Code X | 37 | any city |
| Code 1 | 38 | Albert Lea |
| Code 1 | 39 | Albert Lea |
| Code 1 | 40 | Albert Lea |
| Code 1 | 41 | Albert Lea |
| Code 1 | 42 | Albert Lea |
| Code 1 | 43 | Albert Lea |
| Code 1 | 44 | Albert Lea |
| Code 1 | 45 | Albert Lea |
| Code 1 | 46 | Albert Lea |
| Code 10 | 47 | Rochester |
| Code 11 | 48 | Stewartville |
| Code 11 | 49 | Stewartville |
| Code 11 | 50 | Stewartville |
| Code X | 51 | any city |
| Code 11 | 52 | Stewartville |
| Code 11 | 53 | Stewartville |
| Code 11 | 54 | Stewartville |
| Code 11 | 55 | Stewartville |

FIG. 8B

Enhanced Symbol Table — 600

| Key values for City | Byte Code | First Row | Last Row | Count | RRN Degree |
|---|---|---|---|---|---|
| Albert Lea | 1 | 2 | 46 | 11 | 4.09 |
| Austin | 2 | 1 | 23 | 16 | 1.44 |
| Byron | 3 | 11 | 20 | 4 | 2.50 |
| ... | ... | ... | ... | ... | ... |
| Rochester | 10 | 12 | 47 | 6 | 6.00 |
| Stewartville | 11 | 48 | 55 | 7 | 1.14 |

Columns: 310, 320, 330, 340, 350, 360

FIG. 10

Bitmap  0000100000100000000000000011111111100010010000000001000000000001000011111111111100000000 — 700
Regions                              AAAAAAAAAAAAAAAA                              BBBBBBBBBBBBBBBBBB
                                     710                                            720

FIG. 11

EMBEDDING DENSITIES IN A DATA STRUCTURE

CROSS-REFERENCE TO RELATED APPLICATIONS

This application is related to U.S. patent application Ser. No. 12/120,706, filed on even date herewith by Day et al. and entitled "DETERMINING A DENSITY OF A KEY VALUE REFERENCED IN A DATABASE QUERY OVER A RANGE OF ROWS" (ROC920070286US1), the entire disclosure of which is incorporated by reference herein.

FIELD OF THE INVENTION

The invention relates to computers and computer systems, and in particular, to utilizing indexes to optimize database queries.

BACKGROUND OF THE INVENTION

Databases are used to store information for an innumerable number of applications, including various commercial, industrial, technical, scientific and educational applications. Many databases are relational databases, which organize information into formally-defined tables consisting of rows (i.e., records) and columns (i.e., fields), and which are typically accessed using a standardized language such as Structured Query Language (SQL). Database management systems (DBMS's) are the computer programs that are used to access the information stored in the databases, and to process searches, or queries, against the databases.

In general, a database query references at least one database table in a database and includes at least one predicate. The predicates may include an expression that references a field of the database table, multiple key values in that field, and an operator (e.g., in, etc.). The query may also include a clause that indicates that a subset of an answer set (e.g., a result table) should be returned instead of the entire answer set. To execute the query, many DBMS's perform query optimization, in which multiple execution plans or access plans for satisfying the database query are examined by a query optimizer to determine the most efficient way to execute the query.

One type of optimization that may be utilized in an execution plan includes the building of a bit map. A bit map is usually built during running or execution of the query, and indicates whether a specific value exists for each row in a particular column. One bit represents each row. For example, in a bit map for the value "Byron" in the column "City" of a table, the nth bit of the bit map equals 1 if the nth row in the table contains "Byron" (e.g., Query: Select Name from Table where City='Byron') or 0 if that row holds a value other than "Byron". Because the bit map represents the physical sequence of the rows in the table, the bit map is typically utilized to sequentially scan the table and to skip all the rows in the table that do not contain the desired value, also referred to as skip sequential processing. As such, bit maps typically improve query performance.

A bit map is usually built from an index, which itself is built over the table. An index is usually built over one or more fields of the database table, such as field "City", and in many cases include sufficient information about which particular records in a database table likely match key values in a predicate without having to retrieve and scan all of the individual records of the database table. Without an index, a DBMS assumes an even distribution in the table of the desired key values and performs a full table scan of the database table, blindly searching through every row in the database table until the target data is located. Depending upon where the data resides in the database table, such a table scan can be a lengthy and inefficient process.

One type of index that may be utilized to build a bit map is an encoded vector index ("EVI"). An EVI is a data structure that is made up of two primary components: a symbol table and a vector table. The symbol table contains the distinct key values in the rows of a table covered, as well as statistical information about each key. The statistical information typically includes a numeric byte code identifying the key, the first and last rows of the table where the key is found (i.e., the relative record number (RRN)), and the number of times the key appears in the table (i.e., count). The vector table contains a list of byte codes indicating which key is contained in each row, and as the byte codes are generally in the same ordinal position as the rows in the table, the vector table corresponds to the actual rows in the table.

The byte codes of the vector table of the EVI are often utilized to dynamically build a bit map for a given key value. In particular, a single bit map is often built over the entire vector table to account for all the values occurring in the column (whether they be "Byron", "Rochester", or any other). So in an EVI on the "City" column, the nth position of a bit map created using that EVI contains a bit that identifies whether the value of "City" in the nth row of the table is or is not the given key value.

Although bit maps typically improve query performance, many resources are required to build bit maps and to use the bit maps. As such, bit maps are generally not built when the database query includes a clause that indicates that a subset of an answer set that satisfies the database query is to be returned, such as a fetch first clause or an optimize clause. Bit maps are not built because when a subset is to be returned, the resources required to populate a full bit map from an index typically exceed the resources that would be used to randomly access the records of the table directly through the index.

In general, fetch first clauses, optimize clauses, and similar clauses (e.g., FIRSTIO) are commonly included in a database query when the rows to be returned will be displayed on a screen or window. As users typically want to get the first screen back quickly, at least a couple of rows of the answer set may be quickly displayed to a user by including such a clause in the query. Moreover, the user may be provided with results much sooner than if the user had to wait for every row to be returned. Without these clauses, the database engine will typically retrieve all the rows of the answer set.

Specifically, a fetch first clause (e.g., FETCH FIRST ROW ONLY, FETCH integer ROWS, etc.) usually sets a maximum integer of rows that will be retrieved, regardless of the quantity of rows in the answer set that satisfy the database query. The integer is usually a positive non-zero number. The database engine will cease processing the query once it has retrieved the first integer of rows, and an attempt to fetch beyond the maximum integer of rows is handled as if the data ended.

The optimize clause (e.g., OPTIMIZE FOR integer ROW, Optimize for N Rows, etc.) indicates that the query does not intend to retrieve more than integer of rows from the answer set. As such, the optimizer will optimize the query based on the specified integer of rows. The clause does not change the answer set or the order in which the rows are fetched. Any number of rows can be fetched, but performance can possibly degrade after the specified number of fetches.

As the reliance on information increases, both the volume of information stored in most databases, as well as the number of users wishing to access that information, likewise increases. Moreover, as the volume of information in a database, and the number of users wishing to access the database increases, the amount of computing resources required to manage such a database increases as well. Thus, new ways to build bit maps, which often require many system resources to build, are needed in order to continue to provide significant improvements in query performance; otherwise, database users will be hampered in their ability to maximize intelligent information retrieval.

BRIEF SUMMARY OF THE INVENTION

The invention addresses these and other problems associated with the prior art by providing a program product, an apparatus, and a method that determine a density for each key value of a plurality of key values in a table over at least one range of rows in the database table, and store the determined densities in a data structure for use in optimizing a query that references a key value in the plurality of key values in the table. By doing so, the density of various key values may be determined and dynamically maintained, often resulting in optimization data for improved query optimization.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE SEVERAL VIEWS OF THE DRAWINGS

FIG. 7A is an example of selected fields from a relational database table suitable for utilizing densities consistent with the invention.

FIG. 7B is a continuation of the example of selected fields from FIG. 7A.

FIG. 8A is an example of an encoded vector index (EVI) built over a field of the relational database table of FIGS. 7A and 7B.

FIG. 8B is a continuation of the example of the encoded vector index (EVI) of FIG. 8A.

FIG. 10 is an example of a modified symbol table that may be incorporated into the encoded vector index of FIGS. 8A and 8B.

FIG. 11 is an example of a bit map that may be generated consistent with the principles of the present invention.

DETAILED DESCRIPTION OF THE INVENTION

Embodiments consistent with the invention determine a density of a key value referenced in a database query over at least one range of rows in a database table referenced by the database query, and utilize the determined density to optimize the database query. Embodiments consistent with the invention may process a database query that specifies key values for a single field in a particular database table, and during processing of the query, a density may be determined for each of the key values referenced in the database query. The determined densities may then be compared to determine which key value is the lowest, which is indicative of a denser range of rows. A bit map may be built for the selected key value over the denser range of records to improve query processing.

Embodiments consistent with the principles of the present invention may also identify at least one region of high density in the bit map. Each region is an I/O sized block and at least one of the identified regions of high density may be utilized to satisfy the database query. Specifically, the regions of high density in the bit map may indicate the denser portions of the table (i.e., more instances of the key value), and may maximize the quantity of rows that may be retrieved in a single IO. Once enough regions have been identified to satisfy the database query, the actual retrieval of the rows from the table may commence. As such, query performance may be further improved as the requisite quantity of rows may be retrieved with fewer I/O's, or in some instances, the fewest I/O's.

Figure 1:
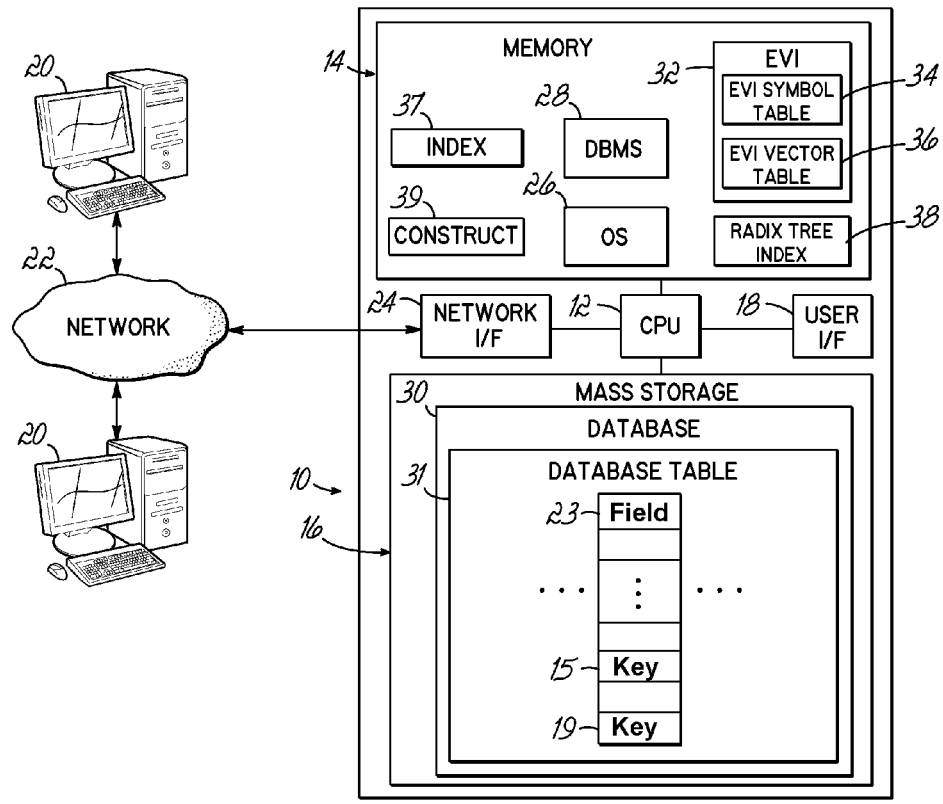
FIG. 1 is a block diagram of a networked computer system incorporating a database management system within which is implemented query optimization with densities consistent with the invention.

Turning now to the Drawings, wherein like numbers denote like parts throughout the several views, FIG. 1 illustrates an exemplary hardware and software environment for an apparatus 10 suitable for implementing a database management system incorporating query optimization with densities consistent with the invention. For the purposes of the invention, apparatus 10 may represent practically any type of computer, computer system or other programmable electronic device, including a client computer, a server computer, a portable computer, a handheld computer, an embedded controller, etc. Moreover, apparatus 10 may be implemented using one or more networked computers, e.g., in a cluster or other distributed computing system. Apparatus 10 will hereinafter also be referred to as a "computer," although it should be appreciated that the term "apparatus" may also include other suitable programmable electronic devices consistent with the invention.

Computer 10 typically includes a central processing unit (CPU) 12 including one or more microprocessors coupled to a memory 14, which may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor in CPU 12, as well as any storage capacity used as a virtual memory, e.g., as stored on a mass storage device 16 or on another computer coupled to computer 10.

In the context of the invention, at least one index may be resident in memory 14. For example, an encoded vector index (EVI) 32 and/or a radix tree index or radix index 38 may be resident in memory 14. EVI 32 may include a symbol table 34 and a vector table 36. In some systems, radix index 38 may have a field, usually a hidden key field as the last key field in the index, that contains the relative record numbers corresponding to the actual rows in database table 31. Also resident in memory 14 may be at least one index 37 and/or at least one construct 39. Index 37 may be practically any index that contains information about key values identified in database query 46, as well as information about records in database table 31 located in database 30 that include instances of the key values. Similarly, construct 39 may be practically any construct that contains information about key values identified in database query 46 and information about records in database table 31 that include instances of the key values. Construct 39 need not be a formal index, instead, construct 39 may be a proprietary structure, file structure, database object, etc. EVI 32, radix tree index 38, construct 39, and/or index 37 may be associated with (e.g., built over) field 23 of database table 31. In the context of the invention, "index" or "indexes" may be any one of these indexes or structures.

Computer 10 also typically receives a number of inputs and outputs for communicating information externally. For interface with a user or operator, computer 10 typically includes a user interface 18 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal, e.g., via a client or single-user computer 20 coupled to computer 10 over a network 22. This latter implementation may be desirable where computer 10 is implemented as a server or other form of multi-user computer. However, it should be appreciated that computer 10 may also be implemented as a standalone workstation, desktop, or other single-user computer in some embodiments.

For non-volatile storage, computer 10 typically includes one or more mass storage devices 16, e.g., a floppy or other removable disk drive, a hard disk drive, a direct access storage device (DASD), an optical drive (e.g., a CD drive, a DVD drive, etc.), and/or a tape drive, among others. Furthermore, computer 10 may also include an interface 24 with one or more networks 22 (e.g., a LAN, a WAN, a wireless network, and/or the Internet, among others) to permit the communication of information with other computers and electronic devices. It should be appreciated that computer 10 typically includes suitable analog and/or digital interfaces between CPU 12 and each of components 14, 16, 18, and 24 as is well known in the art.

Computer 10 operates under the control of an operating system 26, and executes or otherwise relies upon various computer software applications, components, programs, objects, modules, data structures, etc. For example, a database management system (DBMS) 28 may be resident in memory 14 to access a database 30 resident in mass storage 16. Database 30 may have at least one database table 31 and each database table may have at least one field containing key values. Multiple key values may be present in a field, including multiple instances of a single key value. As illustrated, database table 31 has a field 23, which has at least one key value, such as key values 15 and key values 19. Moreover, various applications, components, programs, objects, modules, etc. may also execute on one or more processors in another computer coupled to computer 10 via a network, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Figure 2:
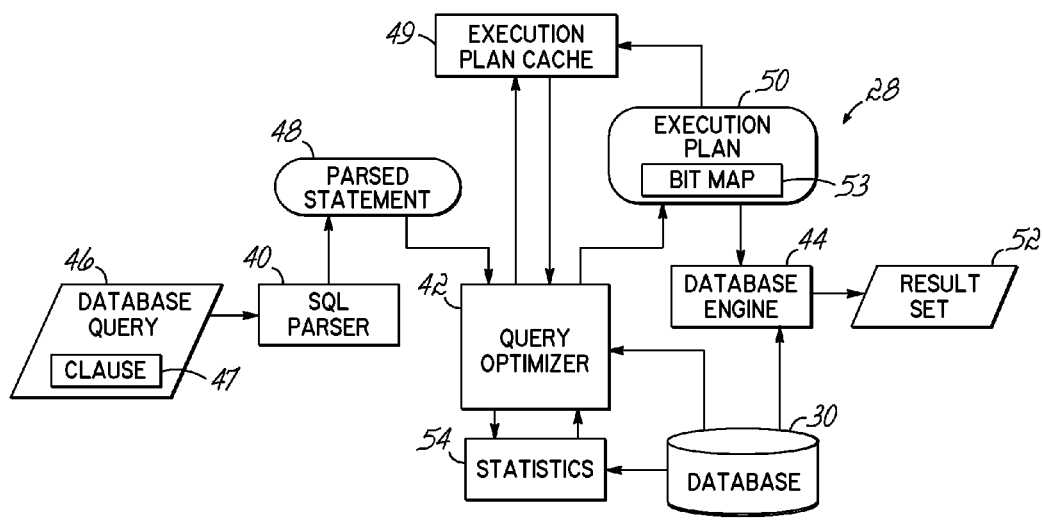
FIG. 2 is a block diagram illustrating the principal components and flow of information therebetween in the database management system of FIG. 1.

FIG. 2 next illustrates in greater detail the principal components in one implementation of DBMS 28. The principal components of DBMS 28 that are generally relevant to query execution are a Structured Query Language (SQL) parser 40, query optimizer 42 and database engine 44. SQL parser 40 receives from a user (or more typically, an application executed by that user) a database query 46 with a clause 47, which in the illustrated embodiment, is provided in the form of a SQL statement. SQL parser 40 then generates a parsed statement 48 therefrom, which is passed to optimizer 42 for query optimization. As a result of query optimization, an execution plan or access plan 50 is generated. Execution plan 50 may have an instruction to build a bit map 53 during execution of database query 46.

Once generated, the execution plan is forwarded to execution plan cache 49 to be stored for future use and to database engine 44 for execution of the database query on the information in database 30. The result of the execution of the database query is typically stored in a result set, as represented at block 52. To facilitate the optimization of queries, the DBMS 28 may also include statistics 54, which may be statistical information that is gathered, created, and/or analyzed using database 30 for query optimizer 42.

In the context of the invention, a database query 46 may be received for processing by DBMS 28. Database query 46 may specify a key value 15 and a key value 17 of field 23 in database table 31. Database query 46 may also include at least one clause 47 that indicates that a subset of an answer set that satisfies the database query is to be returned. Query optimizer 42 may generate an execution plan 50 in light of clause 47. Query optimizer 42 may determine the first row (e.g., first RRN) and the last row (e.g., last RRN) of a range of rows (i.e., range of records) in field 23 that includes instances of key value 15. Query optimizer 42 may also determine a count representative of the number of times that key value 15 appears in the range of rows. Similarly, query optimizer 42 may determine the first row and the last row of a range of rows in field 23 that includes instances of key value 19, and a count representative of the number of times that key value 19 appears in the range of rows. In some embodiments, these values may be determined from statistics 54, from an index such as EVI 32, radix tree index 38, index 37, construct 39, etc., or a tool.

Next, query optimizer 42 may generate a value indicative of density for each key value 15 and 19 utilizing the determined values. The density of a key value is indicative of the number of instances of that key value in a range of rows, and may be determined and/or represented in a variety of ways. For example, query optimizer 42 may generate a RRN degree value, which is effectively a value that decreases as the number of records in a range increases and/or the size of the range decreases, by using the following formula:

$$(\text{the last row of the range of rows} - \text{the first row of the range of rows} + \text{one})/(\text{the count}).$$

One of ordinary skill in the art will appreciate that "density" may be represented using any value that varies based upon the relative number of records matching a certain criteria within a particular range of records. While the RRN degree value decreases as the number of records in a range increases and/or the size of the range decreases, other values indicative of density may use an inverse representation of density, e.g., by dividing the count by the size of the range so that the value increases as the number of records in a range increases and/or the size of the range decreases. Other manners of representing density within the context of the invention will be appreciated by one of ordinary skill in the art having the benefit of the instant disclosure. Thus, while the formula described above for the RRN degree is used hereinafter to describe the density calculated in the illustrated embodiments of the invention, the invention is not limited to this particular representation of density.

As such, by calculating RRN degree values for key values 15 and 19, query optimizer 42 may utilize the RRN degree values of key value 15 and of key value 19 to optimize database query 46. Specifically, query optimizer 42 may compare the RRN degrees to determine which has the lowest RRN degree (i.e., the lower the RRN degree the denser the key value). The key value with the lowest RRN degree may be selected, and query optimizer 42 may add an instruction in execution plan 50 to generate a bit map 53 during execution of database query 46 over the range of rows of the key value with the lowest RRN degree (i.e., the denser). As such, those of ordinary skill in the art may appreciate that by determining the RRN degree of multiple key values in ranges of rows in the field, denser ranges of rows may be identified and utilized by optimizer 42 to satisfy the database query.

Bit map 53 may be generated dynamically during execution of database query 46 by database engine 44. After it is generated, database engine 44 may also identify at least one region of high density in bit map 53, which indicate the denser portions of field 23 of table 31. As indicated hereinabove, density may be determined and/or represented in a variety of ways. Thus, "high density" is meant to indicate that the region has many instances of the key value, specifically, more instances of the key value than another region. Moreover, although the terms "high density" are utilized, a region of high density may have a lower RRN degree and/or the lowest RRN degree when the RRN degree is compared to that of other regions. Nonetheless, each region is an I/O sized block.

In identifying the regions of high density, bit map 53 may be partitioned into blocked I/O size and a RRN degree may be determined for each region or partition. The RRN degrees of the regions may be compared to determine the denser regions. Next, database engine 44 may utilize as many regions of high density of bit map 53 as necessary to satisfy database query 46. Specifically, database engine 44 may retrieve the rows from table 51 that correspond to the regions of high density identified from bit map 53.

Those of ordinary skill in the art may appreciate that based upon the principles of the present invention, the resources used to build the bit map may be reduced and the random I/Os required to retrieve the specified number of result rows may also be reduced. In particular, to achieve the performance gain, the smallest range of co-located rows (i.e., rows located near each other) may be identified via the RRN degrees. For example, utilizing an EVI, the principles of the present invention may take advantage of RRN information stored in the EVI for each key value (i.e., byte code) referenced in database query 46 such as the first RRN, the last RRN, and the count (e.g., the number of byte code values in a vector table 36 of EVI 32) of the range of rows for each key value. As such, the denser or the most dense portion of the table may be used to find the rows to be selected, resulting in reduced resource usage for building the bit map and often leading to the utilization of the fewest physical I/Os to the disk units to retrieve the selected row data to satisfy the database query.

Despite the exemplary system illustrated in FIG. 1 and the exemplary implementation of DBMS 28 illustrated in FIG. 2, these are not intended to limit the present invention. Indeed, those skilled in the art will recognize that other alternative hardware and/or software environments may be used without departing from the scope of the invention. For example, different functionality than that described herein may be accorded to the components consistent with the principles of the present invention.

Figure 3:
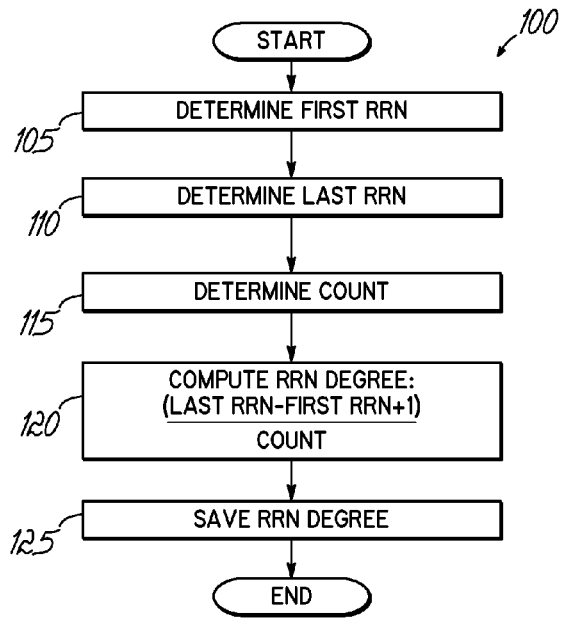
FIG. 3 is a flowchart illustrating the program flow of a density determination routine executed in the database management system of FIG. 1.

Turning to FIG. 3, FIG. 3 is a flowchart illustrating the program flow of a density determination routine 100 executed in the database management system of FIG. 1. In block 105, the first RRN may be determined for a range of rows in field 23 for key value 15. The first RRN may be determined from statistics 54, from an index such as EVI 32, radix tree index 38, index 37, construct 39, etc., or a tool. The range of rows may be over the whole field 23 or only a portion of field 23. The range of rows may be identified from an index (e.g., symbol table 34 of EVI 32). In block 110, the last RRN may be determined for the range of rows in field 23 for key value 15. In block 115, the count may be determined for the range of rows.

Next, the RRN degree may be computed in block 120. In particular, the RRN information, along with the count, for example, may be determined from the symbol table 34 of EVI 32 and utilized to calculate a RRN degree representative of the density. The RRN degree may be determined using the following:

$$\text{RRN Degree} = (\text{Last Row} + \text{First Row} + 1)/\text{Count}.$$

In particular, the difference between the last RRN and the first RRN may be first determined, and the value of one may then be added to the difference. The resulting value may then be divided by the count. The lower the RRN Degree, the more records that may be selected in the range of rows or range of RRN's. In other words, the lower the RRN degree, the denser the key value in the range of rows. An RRN degree value of one (i.e., 1) may indicate that all rows may be selected (e.g., all the rows of the range of rows contain key value 15). The determined RRN degree may be saved in block 125 in an index such as EVI 32, radix tree index 38, index 37, construct 39, etc. Moreover, routine 100 may be repeated for each key value referenced in database query 46, in field 23, etc.

Figure 4:
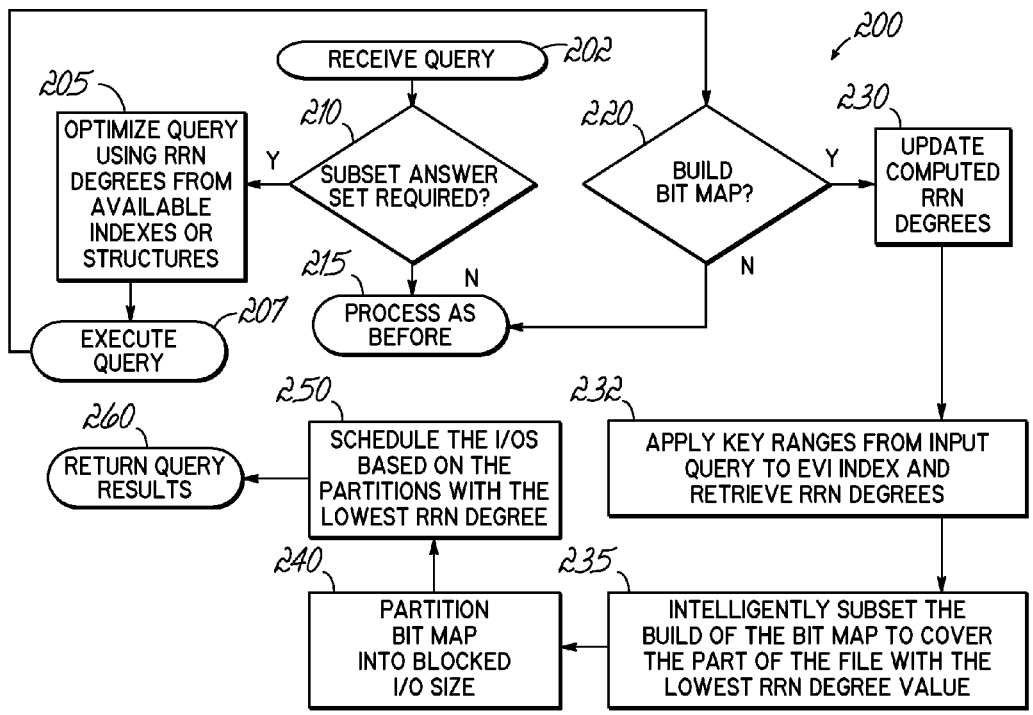
FIG. 4 is a flowchart illustrating the program flow of a query optimization with densities routine executed in the database management system of FIG. 1.

FIG. 4 is a flowchart illustrating the program flow of a query optimization with densities routine 200 executed in the database management system of FIG. 1. Starting with block 202, database query 46 may be received for processing from a user. The predicates and clauses of the database query may be analyzed to determine if they indicate that a subset of the answer set is required in block 210. Such clauses may be Fetch First N Rows, Optimize For N Rows, FIRST IO, etc. Those of ordinary skill in the art may appreciate that as such clauses may also affect the optimization of the query; the determination may be made before optimization of the query to avoid having to re-optimize the query. Furthermore, the predicates and clauses may be analyzed to see which key values may satisfy the database query. For example, query 46 references multiple key values 15 and 19 in field 23 of database table 31, and the database query may be satisfied with rows from any of these key values.

Figure 5:
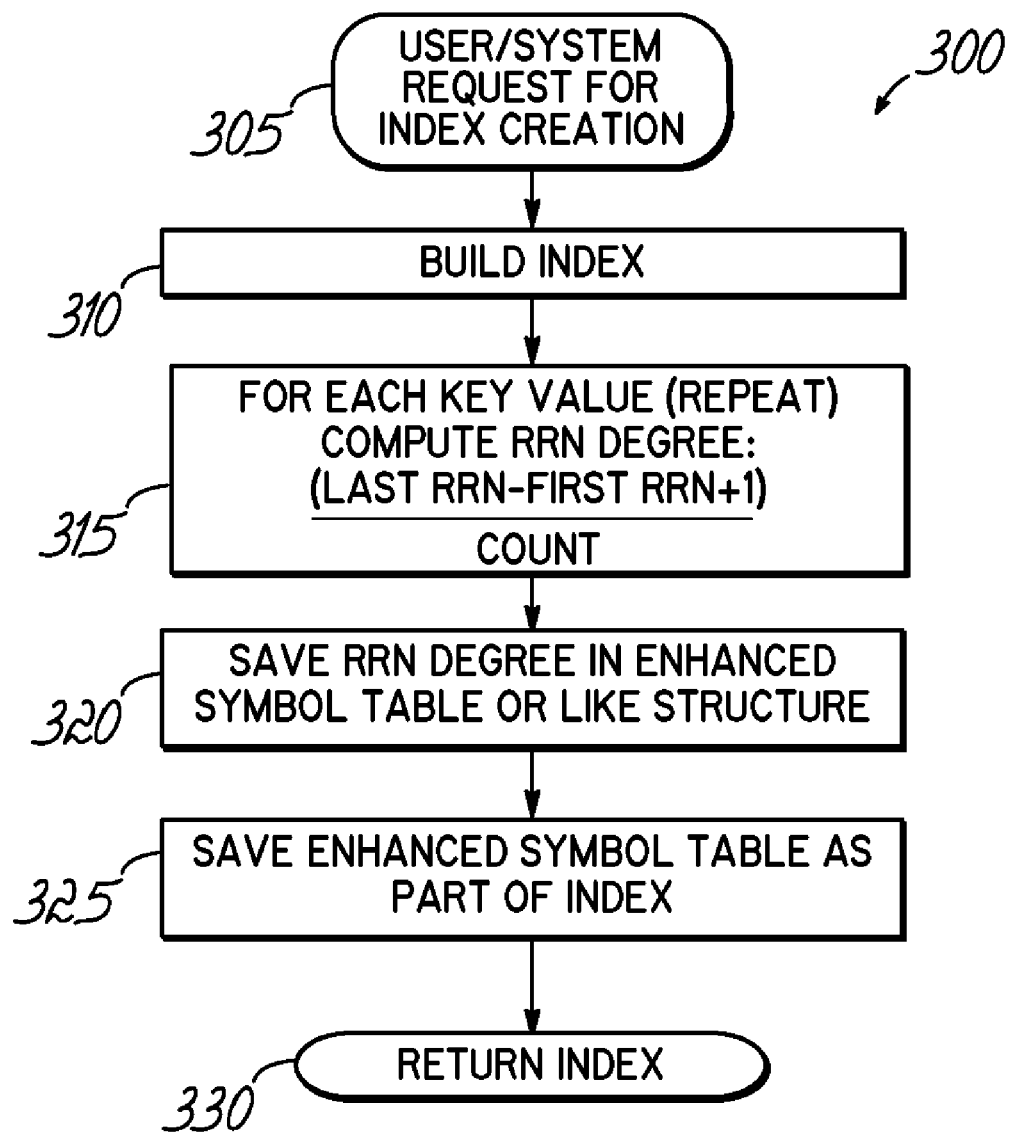
FIG. 5 is a flowchart illustrating the program flow of an embedding density information into an index routine executed in the database management system of FIG. 1.
Figure 6:
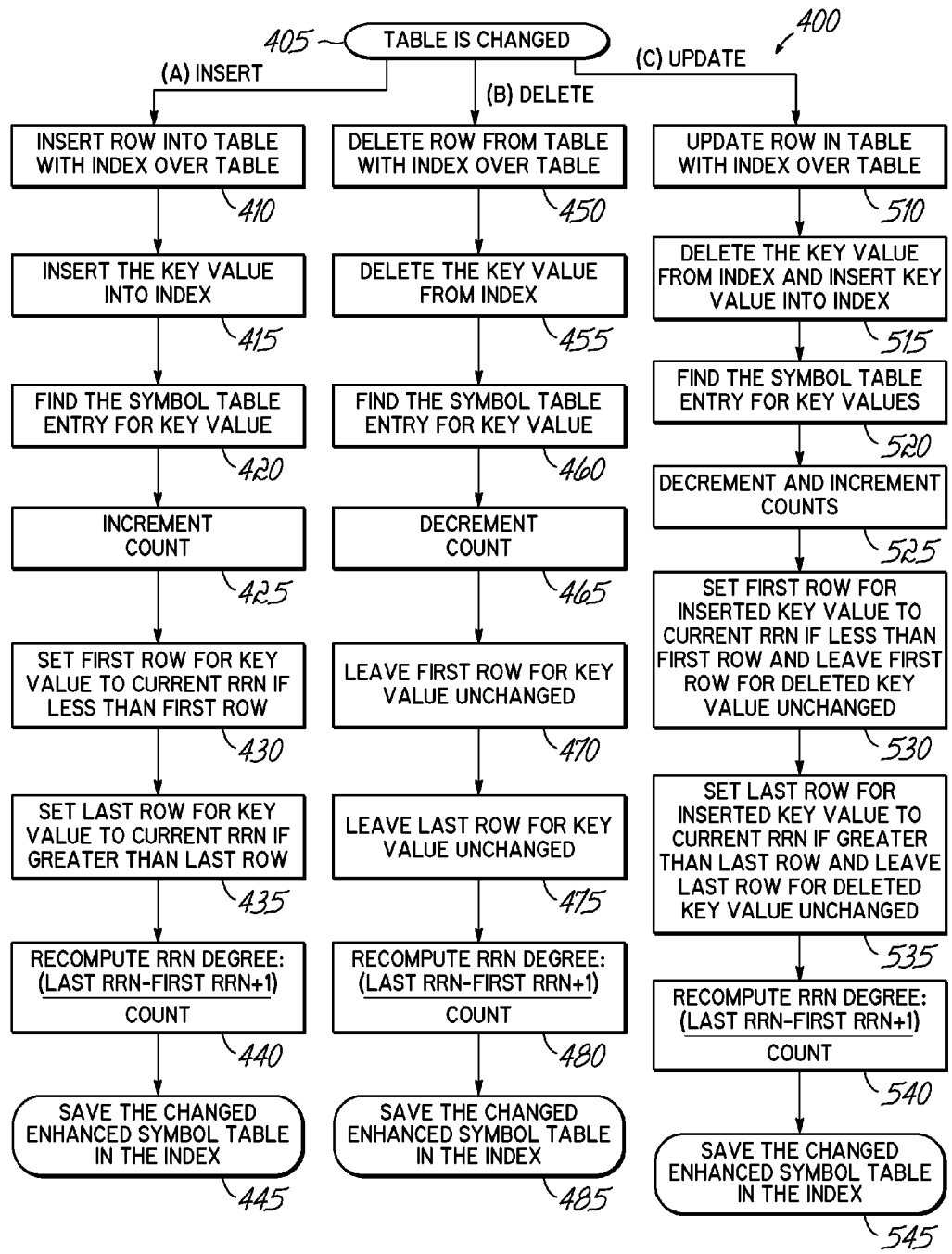
FIG. 6 is a flowchart illustrating the program flow of an index maintenance routine executed in the database management system of FIG. 1.

If a subset is not required, control may pass to block 215 to process the query as before or as conventionally processed. However, if a subset of the answer set is required, control may pass to block 205 to optimize query 46 using RRN degrees for each key value 15, 19 referenced in the query from available indexes or structures. The RRN degrees may be available in indexes or structures due to routine 100 of FIG. 3, or routine 300 of FIG. 5 and/or routine 400 of FIG. 6. FIGS. 5 and 6 will be discussed in further detail hereinbelow. Alternatively, if RRN degrees are not available in indexes or structures, control may pass to routine 100 of FIG. 3 to determine the RRN degrees. The RRN degrees may be retrieved or calculated as part of building execution plan 50 by optimizer 42.

Next, execution of database query 46 with execution plan 50 may begin in block 207. During execution, control may pass to block 220 to determine if a bit map should be generated from the execution plan. In particular, if the execution plan does not indicate that a bit map should be built, for example, from vector table 36 of EVI 32, control may pass to block 215 to process the query as before. However, if a bit map is to be built, control may pass to block 232 to update the computed RRN degrees. Those of ordinary skill in the art may appreciate that it may be advantageous to update the computed RRN degrees because table 31 may have changed between when the execution plan was generated in block 205 and block 230. Changes to the database table will be discussed further in connection with routine 400 in FIG. 6.

Next, control may pass to block 232 to apply key ranges from the input query to the EVI index and retrieve the RRN degrees. Specifically, the keys from the query may be searched in symbol table 34 of the EVI index 32 and the RRN degrees may be retrieved for each of the key values 15 and 19 from the symbol table. Although an EVI is utilized, radix tree index 38 may contain a field of RRN degrees and may be utilized instead of the EVI. Those of ordinary skill in the art will also appreciate that other embodiments are also contemplated.

Control may next pass to block 235 to intelligently subset the building of bit map 53 to cover the part of the file (i.e., table 31) with the lowest RRN degree value. The lowest RRN degree value may indicate the densest part of the file. Those of ordinary skill in the art may appreciate that as a query may be satisfied with rows from any of the key values in the database query, it may be advantageous to determine the key value that is denser and build bit map 53 over the range of rows associated with the key value with the lowest RRN degree (i.e., the denser). The bit map may be built over the range of rows, for example, utilizing vector table 56 of EVI 32, radix tree index 38, etc.

The generated bit map 53 may be partitioned into blocked I/O size in block 240. As part of partitioning the bit map, bit map 53 may be divided into regions, and a density (e.g., RRN degree) may be calculated for each region. As such, the partitions or regions of high density may be identified. In particular, the generated bit map may be scanned to select the portions that contain the highest percentage of the key value to optimize the number of rows selected per random I/O. In other words, the bit map may be scanned to identify regions of bits of the bit map that may provide the highest number of selected rows. Those of ordinary skill in the art may appreciate that this step (e.g., identifying regions of high density in the bit map) may be performed independently of the first step (e.g., generating the RRN degree for the key value for building the bit map) in some embodiments, but the first step may reduce the cost to build the bit map, making this second step more cost efficient. If performed independently, the bit map may be a full bit map, for example, over the entire vector table 36, or the bit map may be less than a full bit map.

Next, control may pass to block 250 to schedule the I/Os based on the partitions with the lowest RRN degree(s) (i.e., high density). To schedule the I/Os, a value representative of the maximum number of rows that can be retrieved with a single I/O (i.e., maximum number of bits in a region) may be calculated as follows:

$$\text{value representative of the maximum number of rows that can be retrieved with a single I/O} = \frac{\text{(a maximum hardware number of bytes per I/O)}}{\text{(an average table row size)}}$$

The value may be referred to as MaxRowsIO and as such, may be calculated as follows:

$$\text{MaxRowsIO} = \frac{\text{(a maximum hardware number of bytes per I/O)}}{\text{(an average table row size)}}.$$

Once enough regions are identified to satisfy the required number of rows for the database query, the actual retrieval of the rows may commence and the query results may be returned in block 260. Enough regions may include a single partition or multiple partitions.

FIG. 5 is a flowchart illustrating the program flow of an embedding density information into an index routine 300 executed in the database management system of FIG. 1. In block 305, a user and/or system may request creation of a database index such as EVI 32. However, routine 300 may be modified to utilize other types of indexes as well. Next, the index may be built in block 310 utilizing conventional techniques. A RRN degree may be computed for each key value in block 315. The following may be utilized to generate the RRN degree: RRN Degree=(Last RRN−First RRN+1)/(Count). In particular, block 315 may be repeated for each key value.

Next, in block 320, each of the RRN degrees may be saved in the index, for example, in a modified symbol table like an enhanced symbol table or like structure within the index. The enhanced symbol table may be similar to symbol table 34 but with an additional RRN degree field. Control may pass to block 325 to save the enhanced symbol table as part of the index and then to block 330 to return the index.

FIG. 6 is a flowchart illustrating the program flow of an index maintenance routine 400 executed in the database management system of FIG. 1. As table 31 referenced in database query 46 may change, routine 400 may be utilized to account for the changes in the index built over the table (i.e., the field of the table). The index may be the index created by routine 300 of FIG. 5 such as EVI 32. Starting with block 405, a change to the table, such as an insert, delete, update, etc. may be detected. An insert statement may add at least one record to the database table, a delete statement may remove at least one record from the database table, and an update statement may change at least one record in the database table. If the table over which the index is built has changed because a row was inserted, control may pass to blocks 410, 415, 420, 425, 430, 435, 440, and 445. If the table over which the index is built has changed because a row was deleted, control may pass to blocks 450, 455, 460, 465, 470, 475, 480, and 485. If the table over which the index is built has changed because a row in the table was updated, control may pass to blocks 510, 515, 520, 525, 530, 535, 540, and 545.

Turning first to the situation where a row is inserted into the table, control may pass to block 410 to insert the row into the table and then to block 415 to insert a key value corresponding to the inserted row into the index.

Next, the enhanced symbol table may be changed to reflect the insertion. Specifically, control may pass to block 420 to find the enhanced symbol table entry for the key value and then to block 425 to increment the count for the key value. Next, control may pass to block 430 to set the first row (i.e., first RRN) for the key value to current RRN if less than first row, and then to block 435 to set the last row (i.e., last RRN) for the key value to current RRN if greater than last row. As such, the range of rows in the enhanced symbol table may be adjusted, if necessary. The RRN degree may be recomputed in block 440 to account for the inserted row or computed for the first time if the key value is new. The RRN degree may be computed by (Last RRN−First RRN+1)/(count). The changed enhanced symbol table may be saved in the index in block 445.

If a row is deleted from the table, control passes to block 450 to delete the row from the table, and to block 455 to delete a key value corresponding to the row into the index. Next, the enhanced symbol table may be changed to reflect the deletion. Specifically, control may pass to block 460 to find the enhanced symbol table entry for the key value and then to block 465 to decrement the count for the key value. Control may then pass to block 470 to leave the first row (i.e., first RRN) for the key value unchanged, and to leave the last row (i.e., last RRN) for key value unchanged in block 475. In particular, those of ordinary skill in the art may appreciate that it may not be advantageous to change the first row and the last row, but in some embodiments, these may be changed to reflect the current RRN's. The RRN degree may be recomputed in block 480 using (Last RRN−First RRN+1)/(count). The changed enhanced symbol table may be saved in the index in block 485.

If a row is updated in the table, control may pass to block 510 to update the row in the table. The key value corresponding to the deleted row may be deleted from the index and the key value corresponding to the inserted key value may be inserted into the index in block 515. Next, the enhanced symbol table may be changed to reflect the update. Specifically, control may pass to block 520 to find the enhanced symbol table entries for the key values, and then to block 525 to decrement the count for the deleted key value and increment the count for the inserted key value.

Next, control may pass to block 530 to set the first row (i.e., first RRN) for the inserted key value to current RRN if less than first row and to leave the first row (i.e., first RRN) for the deleted key value unchanged. Control may pass to block 535 to set the last row (i.e., last RRN) for the inserted key value to current RRN if greater than last row and to set the last row (i.e., last RRN) for key value to current RRN if greater than last row, and to leave the last row (i.e., last RRN) for the deleted key value unchanged. The RRN degrees may be recomputed in block 540 and the changed enhanced symbol table may be saved in the index in block 545.

An update may be a combination of an insertion and a deletion. However, between an insertion and a deletion, the deletion may include a decrement of the count instead of an increment, and leaving the first row and last row for the key value unchanged instead of setting them to current RRN's. Nonetheless, those of ordinary skill in the art may appreciate that the RRN degree information may be embedded in a database index as part of a new enhanced symbol table. In particular, the RRN degree information may then be maintained dynamically in the enhanced symbol table whenever rows in the table over which the EVI is built are inserted, deleted, or updated. As tables are often changed in many environments at different times than when the tables are queried, dynamically maintaining the index may improve the performance of queries that reference the changed tables. Indeed, tables are often updated such as at off-shift times instead of during the highest query activity times; therefore, dynamically updating the indexes on updates during these off-shift times may improve the performance of read only queries that reference the same tables during high query activity times.

Figure 9:
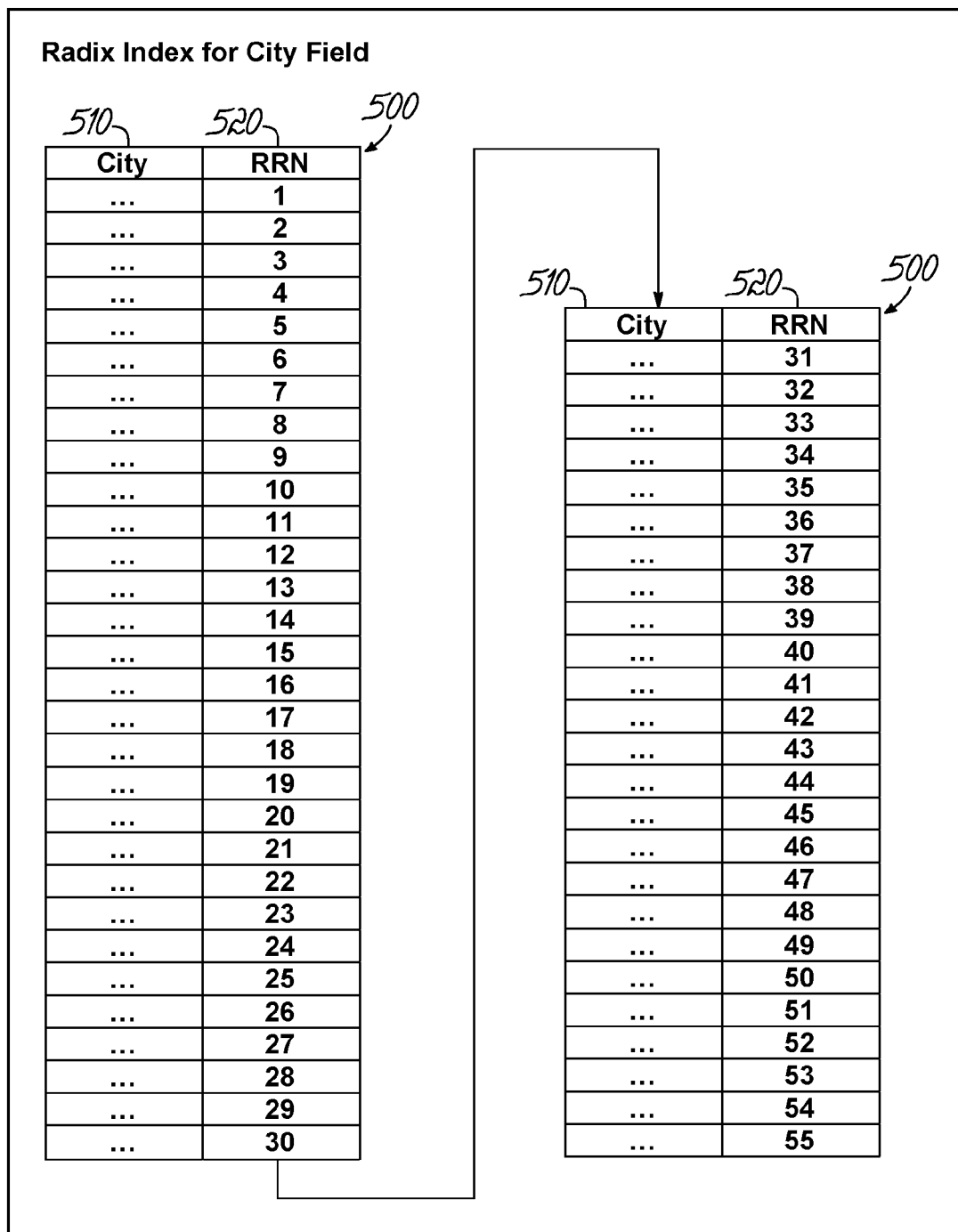
FIG. 9 is an example of a radix tree index built over a field of the relational database table of FIGS. 7A and 7B.

Turning now to a variety of examples that utilize FIGS. 7A, 7B, 8A, 8B, 9, and 10, these figures illustrate City Field 260 of relational database Table_1 200 (FIGS. 7A and 7B), an encoded vector index (EVI) 290 built over the City Field 260 (FIGS. 8A and 8B), and a radix tree index 500 built over the City Field 260 (FIG. 9). EVI 290 includes a symbol table 300 and a vector table 400 (FIGS. 7A and 7B) and the symbol table 300 may be replaced with an enhanced symbol table 600 (FIG. 10).

To facilitate the discussion of the examples, in FIGS. 8A and 8B, a RRN column 420 and a city matching byte code column 430 are illustrated in EVI 290 for reference, in phantom, although the byte code column 410 may be the only column in vector table 400. The RRN values in the RRN column 420 are implied by the ordinal position of the byte code column 410 in vector table 400, and as such, no separate column is typically required to store this information. The RRN's correspond to the row numbers in Table_1 200 (FIGS. 7A and 7B) over which EVI 290 is built. The city that matches the byte code column 430 is defined by the byte code in symbol table 300. An RRN column 280 is also illustrated for reference, in phantom, in Table_1 200 (FIGS. 7A and 7B). Radix index 500 in FIG. 9 may also optionally include a hidden RRN key field 520 as the last key field in the index.

Turning to the first example, a query such as Query_1 may be received.

| Query_1 |
|---|
| Select * <br> From Table_1 A <br> Where City = in ('Austin', 'Albert Lea') <br> Fetch First 10 Rows Only |

Query_1 includes a Fetch First 10 Rows Only clause and may be satisfied with 10 records from Table_1 where the key value in the city field is Austin or Albert Lea. The Fetch First N Rows clause sets the maximum number of rows that can be retrieved to 10, and any first 10 rows that satisfy Query_1 may be returned. Query processing may cease once 10 rows are returned, but "Fetch First" does not mean the physically first 10 rows in the table. The physical order is an internal implementation that the user or customer need not know about.

Based upon the principles of the present invention, additional information about which 10 rows may be returned the fastest may be provided to the optimizer. Specifically, from the first row column 330, the last row column 340, and the count column 350 of symbol table 300 of EVI 290 (FIG. 8A), the RRN degrees of each key value in the City field 260 over a range of RRN's may be determined, and especially for the key values Austin or Albert Lea referenced in Query_1. The RRN degrees may be stored with EVI 290 in column 360 of enhanced symbol table 600 (FIG. 10), a modified symbol table 290.

As illustrated in symbol table 300 (FIG. 8A), 'Austin' values are clumped between RRN 1 and RRN 23 and 'Albert Lea' values are more spread out, between RRN 2 and RRN 46. Although both may be utilized to select 10 rows (e.g., the count of Albert Lea is 11 and the count of Austin is 16), query processing may be more efficient if Austin is utilized to create the bit map because Austin has an RRN degree of 1.44, which is lower than Albert Lea's RRN degree of 4.09. As such, this may indicate that Austin is denser than Albert Lea in the range of rows. Stewartville has the RRN degree closest to 1, and as such, is the denser key value amongst all the illustrated key values. Nonetheless, a bit map may be generated over the vector table 400 (FIG. 8A) over RRN 1 to RRN 23 with the key value of Austin. However, generation of the bit map may cease after 10 Austin values are found. Furthermore, those of ordinary skill in the art may also appreciate that by looking at the RRN information, generation of the bit map may cease for queries without the Fetch First N Rows Only clause. If the database engine knows that it will not select any records because the RRN ranges determined by the vector table 400 (FIG. 8A) will not match any of the selection in the symbol table 300, the database engine can stop generating the bit map.

Regardless, by using the extra information, the database engine can get to the values of Austin with fewer IO operations then Albert Lea because the RRN degree for Austin is lower than for Albert Lea. In particular, all of the actual rows may be retrieved with a single IO operation (with one block I/O) rather than multiple. It is worth noting, however, that as there are values of Albert Lea in the range selected by Austin, the bit map of Austin will reflect those values, which may increase the number of selected records per IO.

Turning to the second example, a query such as Query_2 may be received.

| Query_2 |
|---|
| Select *<br>From Table_1 A<br>Where City = in ('Austin', 'Albert Lea')<br>Optimize for 10 Rows |

Query_2 includes an Optimize for 10 Rows clause and may be satisfied with 10 records from Table_1 where the key value in the city field is Austin or Albert Lea. The Optimize for 10 Rows clause is similar to the Fetch First N Rows clause, and indicates that the database is to assume that the query does not intend to retrieve more then 10 rows from the answer table. And as such, the optimization techniques are similar to the Fetch First N Rows clause as explained above. However, the optimizer will choose a plan to quickly return that many rows, and if the user desires more data than what is on the screen by paging down, more rows that what was optimized for may be displayed. Whereas if the query were in a batch job, or when all rows are needed to be returned most efficiently, the optimizer may choose a different plan that would be faster overall but not as fast if just a few rows needed to be displayed quickly. Without the clause, the optimizer assumes all rows will be retrieved.

Query_2 may also be modified with a FIRST IO clause. This clause is similar, except that the number of rows to be returned is not specified. The FIRST IO is a setting that may be applied across queries without specifying the optimization goal within each query.

Turning to the third example, a Query_3 (not shown) with an optimize clause may be received. Suppose that the key value Mankato in Query_3 has been chosen based on its RRN degree to build the bit map. The rows for Mankato are spread out as illustrated in bit map 700 of FIG. 11. Bit map 700 is partitioned into regions, including region 710 (illustrated with A's) and region 720 (illustrated with B's). Region 710 covers 12 rows and region 720 covers 15 rows.

In this example, if the optimize clause specifies to select anywhere between 1-12 rows, region 710 or 720 may be used to retrieve with one I/O up to 12 or 15 selected rows. If the optimize clause specifies between 13 and 15 rows, region 720 may be used. If the optimize clause specifies 16-27 rows, both regions may be retrieved. If more than 27 rows are specified, other dense regions may be identified; otherwise the entire bit map may be used.

Thus, once the dynamic bit map has been built utilizing the RRN degrees, the bit map can be further analyzed to identify a dense population of rows which would satisfy the requirement of N number of rows of the optimize clause or other clause. Specifically, the bit map may be scanned to select the portions that contain the highest percentage of selected rows to optimize the number of rows selected per random I/O and/or RRN degrees may be calculated for the regions or partitions. In some embodiments, however, the bit map in the third example may be built without using RRN degrees, for example, via conventional techniques, but may nonetheless be further analyzed to identify regions of high density.

While the above examples are greatly simplified for ease of understanding, it will be appreciated that the performance gains that can be obtained in many environments can be substantial. As another example, consider a database query with a Fetch First 5,000 Rows Only clause performed on a table of employee information that contains 500,000 records, where the table includes an index over a last name field. Consider also a database query searching for all employees with a last name of "Johnson" or "Smith", and that there are approximately 8550 employees company-wide with a last name of "Johnson" and 6000 employees company-wide with a last name of "Smith." If the index over the last name field is used to identify a range of records for the last name of "Johnson", the identified range might be dispersed over a relatively small range, e.g., records 185,000 to 195,000. Similarly, if the index over the last name field is used to identify a range of records for the last name of "Smith", the identified range might be dispersed over a relatively small range, e.g., records 175,000 to 200,000. Consequently, performing a probe or scan of the last name index would still require a relatively computationally expensive operation of processing at least 200,000 entries in the index. However, from the RRN degrees, it is known that Smith is denser than Johnson and a bit map may be built over the range of RRN's 185,000 to 195,000, or over a smaller range, until 5,000 are retrieved. The bit map may be further partitioned into blocked I/Os sizes and the I/Os may be scheduled based on the partitions with the lowest RRN degrees (i.e., regions of high density), As such, the resources to build the bit map and the number of I/Os to retrieve the actual records may be reduced.

Those of ordinary skill in the art may appreciate that via the principles of the present invention, for scenarios of Fetch First N Rows, Optimize for N Rows, FIRST IO, etc., regardless of the number of processors, processor speeds, indexes, or other criteria used by the optimizer, a density may be generated and used to improve performance. Moreover, from the bit map over the range of rows to be selected after using the RRN degree, denser regions may be identified that can be used to optimize block I/O's according to the number of rows to be selected based on the query.

Various modifications may be made to the illustrated embodiments without departing from the spirit and scope of the invention. Therefore, the invention lies in the claims hereinafter appended.

What is claimed is:

1. A method of generating optimization data for a database management system, the method comprising:
   determining a density for each key value of a plurality of key values in a table over at least one range of rows in the database table, wherein the range is unsorted by key value, a first row of the at least one range of rows being stored in a data structure;
   storing the determined densities in the data structure for use in optimizing a query that references a key value in the plurality of key values in the table; and
   dynamically maintaining the data structure in response to detecting a change to the database table that affects the determined density of a key value in the plurality of key values by adjusting the first row of the at least one range of rows of the key value in response to determining that the detected change has caused the key value to be located in a second row in the database table.

2. The method of claim 1, wherein the data structure includes an index.

3. The method of claim 2, wherein the index is an encoded vector index, further comprising storing the determined densities in a symbol table of the encoded vector index.

4. The method of claim 1, wherein determining the density further comprises utilizing at least a portion of a formula to generate the determined density of a key value in the plurality of key values, wherein a count in the formula is representative of a number of times that the key value appears in the range of rows, and wherein the formula comprises:

(a last row of the range of rows−a first row of the range of rows+one)/(the count).

5. The method of claim 1, wherein the second row is located in a row in the table before the first row of the range of rows.

6. The method of claim 1, wherein the second row is located in a row in the table after the first row of the range of rows.

7. The method of claim 1, wherein a count representative of a number of times that the key value appears in the range of rows is stored in the data structure, and wherein dynamically maintaining the data structure further comprises adjusting the count in response to determining that the detected change has affected the number of times that the key value appears in the range of rows.

8. The method of claim 1, wherein dynamically maintaining the data structure further comprises recomputing the determined density for the key value and storing the recomputed determined density for the key value in the data structure in response to determining that the detected change to the table affects at least one of a first row of the range of rows for the key value, a last row of the range of rows for the key value, both the first row and the last row of the range of rows for the key value, or a count for the key value.

9. The method of claim 1, wherein dynamically maintaining the data structure includes not adjusting at least one of a first row of the range of rows for the key value, a last row of the range of rows for the key value, or both the first row and the last row of the range of rows for the key value in response to determining that the detected change to the table deletes the key value.

10. The method of claim 1, wherein an insertion operation causes the detected change.

11. The method of claim 1, wherein an update operation causes the detected change.

12. The method of claim 1, wherein a delete operation causes the detected change.

13. An apparatus comprising:
   a processor;
   a memory; and
   program code resident in the memory and configured to be executed by the processor to generate optimization data for a database management system by determining a density for each key value of a plurality of key values in a table over at least one range of rows in the database table, wherein the range is unsorted by key value, a first row of the range of rows being stored in a data structure, storing the determined densities in the data structure for use in optimizing a query that references a key value in the plurality of key values in the table, and dynamically maintaining the data structure in response to detecting a change to the database table that affects the determined density of a key value in the plurality of key values by adjusting the first row of at least one range of rows of the key value in response to determining that the detected change has caused the key value to be located in a second row in the database table.

14. The apparatus of claim 13, wherein the data structure includes an index.

15. The apparatus of claim 13, wherein the program code is further configured to determine the density by utilizing at least a portion of a formula to generate the determined density of a key value in the plurality of key values, wherein a count in the formula is representative of a number of times that the key value appears in the range of rows, and wherein the formula comprises:

(a last row of the range of rows−a first row of the range of rows+one)/(the count).

16. The apparatus of claim 13, wherein the second row is located in the table before the first row of the range of rows.

17. The apparatus of claim 13, wherein the second row is located in the table after the last row of the range of rows.

18. The apparatus of claim 13, wherein a count representative of a number of times that the key value appears in the range of rows is stored in the data structure, and wherein the program code is further configured to dynamically maintain the data structure by adjusting the count in response to determining that the detected change has affected the number of times that the key value appears in the range of rows.

19. The apparatus of claim 13, wherein the program code is further configured to dynamically maintain the data structure by recomputing the determined density for the key value and storing the recomputed determined density for the key value in the data structure in response to determining that the detected change to the table affects at least one of a first row of the range of rows for the key value, a last row of the range of rows for the key value, both the first row and the last row of the range of rows for the key value, or a count for the key value.

20. The apparatus of claim 13, wherein an insertion operation causes the detected change.

21. The apparatus of claim 13, wherein an update operation causes the detected change.

22. The apparatus of claim 13, wherein a delete operation causes the detected change.

23. A program product, comprising:
   program code resident in the memory and configured to be executed by the processor to generate optimization data for a database management system by determining a density for each key value of a plurality of key values in a table over at least one range of rows in the database table, wherein the range is unsorted by key value, a first row of the range of rows being stored in a data structure, storing the determined densities in the data structure for use in optimizing a query that references a key value in the plurality of key values in the table, and dynamically maintaining the data structure in response to detecting a change to the database table that affects the determined density of a key value in the plurality of key values by adjusting the first row of at least one range of rows of the key value in response to determining that the detected change has caused the key value to be located in a second row in the database table; and
   a recordable computer readable medium bearing the program code.

* * * * *